United States Patent [19]

Sugimura et al.

[11] 4,350,723

[45] Sep. 21, 1982

[54] PEEL-UP TYPE ADHESIVES

[75] Inventors: Takaaki Sugimura, Yokohama; Yutaka Ozawa, Tokyo; Mari Takahashi, Yokohama, all of Japan

[73] Assignee: Nippon Zeon Co. Ltd., Tokyo, Japan

[21] Appl. No.: 228,367

[22] Filed: Jan. 26, 1981

Related U.S. Application Data

[60] Continuation of Ser. No. 50,130, Jun. 19, 1979, abandoned, which is a continuation of Ser. No. 886,666, Mar. 15, 1978, abandoned, which is a division of Ser. No. 732,195, Oct. 14, 1976, abandoned.

[30] Foreign Application Priority Data

Oct. 17, 1975 [JP] Japan .................................. 50-125068

[51] Int. Cl.$^3$ ............................................. D06N 3/18
[52] U.S. Cl. ...................................... 428/42; 524/376; 524/452; 524/501; 524/526; 524/11; 524/524; 524/575

[58] Field of Search ..................... 260/29.6 R, 29.6 E, 260/29.6 ME, 29.7 R, 29.7 H, 29.7 T, 29.7 E.42.17, 42.18; 428/40, 41, 42

[56] References Cited

U.S. PATENT DOCUMENTS

| | | | |
|---|---|---|---|
| 3,640,935 | 2/1972 | Abriss | 524/340 |
| 3,714,078 | 1/1973 | Gordon | 524/340 |
| 3,963,850 | 6/1976 | Doss et al. | 428/286 |
| 4,005,033 | 1/1977 | Georgeau et al. | 521/59 |
| 4,102,845 | 7/1978 | Schroder et al. | 53/410 |
| 4,104,272 | 8/1978 | Pettelkau | 524/764 |

*Primary Examiner*—Paul R. Michl
*Attorney, Agent, or Firm*—Sherman & Shalloway

[57] ABSTRACT

A peel-up type adhesive having a viscosity of 50 to 5,000 poises and comprising a rubber latex or a resin emulsion containing a polymeric substance which is film-forming at room temperature, and 1 to 200 parts by weight, per 100 parts by weight of the solid polymeric substance content of the rubber latex or resin emulsion, of a fibrous material.

3 Claims, No Drawings

PEEL-UP TYPE ADHESIVES

This is a continuation of application Ser. No. 050,130, filed June 19, 1979, now abandoned, which in turn is a continuation of application Ser. No. 886,666, filed Mar. 15, 1978 (now abandoned), which in turn is a division of application Ser. No. 732,195, filed Oct. 14, 1976 (now abandoned).

This invention relates to high-viscosity peel up-type adhesives comprising a rubber latex or a resin emulsion and a fibrous material.

The "peel-up type adhesives", as used herein, denotes adhesives having superior peelability (strong adhesion strength against shear stress and adequate adhesion strength against peel force) which are used for bonding an adherend such as papers, synthetic fibrous cloths, inorganic fibrous cloths and foamed rubber sheets to a substrate composed of such a material as concrete, mortar, asphalt, asbestos, synthetic resins, wood, and iron.

In recent years, adhesives have found a wider range of application in the fields of architecture, interior decoration, and road decoration using colorful floor materials, and have been used to bond a number of materials such as papers, cloths, carpets, foams, and cushioned floors. Typical adhesives heretofore used in these fields include solvent-type adhesives prepared by dissolving epoxy resins or rubbers such as natural rubbers or chloroprene rubbers in organic solvents, and latex-type or emulsion-type adhesives such as natural rubber latices, a vinyl acetate-type emulsion, or an acrylate ester-type emulsion.

The solvent-type adhesives once gained widespread acceptance because of their superior adhesion strength in the wet state, but have been used less in recent years because of the inflammability and toxicity of the organic solvents which evaporate therefrom. Instead, the latex-type or emulsion-type adhesives have been preferred as "solventless adhesives". These two types of adhesives, however, have the common defect that they do not permit easy peeling of the bonded materials at the time of replacing them by new ones. This is presumably because adhesives have attained even greater adhesion strengths as a result of the recent research and development works which have put too much emphasis on the improvement of bond strengths.

As adherend, such as paper, synthetic fibrous cloths, inorganic fibrous cloths and foamed rubber sheets, as bonded to a substrate composed of such a material as concrete, mortar, asphalt, asbestos, synthetic resins, wood, and iron may become dirty or broken during use, and necessity arises from time to time to replace the bonded materials by new ones. Or sometimes, one may want to replace them merely for changing the decoration. If the substrate and the adherend are made of tough materials, the peeling operation will not proceed smoothly, but much labor will be required. When the adherend is made of a relatively fragile material such as foamed rubber, labor required in the peeling operation itself will not be so great, but the adhesive or a part of the adherend often breaks during peeling, and remains attached to the substrate. Thus, much time and labor should be consumed for removing the attached material from the surface of the substrate. All of these difficulties arise from the excessively high bond strength of the adhesives used.

In an attempt to get over these difficulties, a "peel up technique" has recently been developed, and put to practical use. This technique is for the purpose of reducing the excessive bond strength of ordinary adhesives, and comprises coating a releasing agent called a "primer" on the substrate and coating the adhesive thereon so as to facilitate the peeling of the adherend at a later time. This bonding technique has an improvement in that the peeling operation is facilitated while maintaining the same adhesion strength as that attained without using a "primer". However, since this bonding process essentially requires two types of chemicals, a releasing agent and an adhesive, they lend themselves to very troublesome storage, transportation and bonding operation.

It is an object of this invention therefore to remove the defects of the conventional bonding process as mentioned above by providing a one-package peel up-type adhesive that does not require the primer.

Other objects of this invention will become apparent from the following description.

The present invention provides, as a peel up-type adhesive meeting the above object, a composition comprising a rubber latex or resin emulsion containing a polymeric substance which is film-forming at room temperature, and 1 to 200 parts by weight, per 100 parts by weight of the solid polymeric substance content of the rubber latex or resin emulsion, of a fibrous material, and having a viscosity of 50 to 5,000 poises (PS).

Examples of rubber latices that can be used as a base of the adhesive of this invention include natural rubber latices, a styrene/butadiene rubber latex, a carboxy-modified styrene/butadiene rubber latex, an acrylonitrile/butadiene rubber latex, a styrene/isoprene rubber latex, a methyl methacrylate/butadiene rubber latex, a styrene/butadiene/methyl methacrylate rubber latex, an acrylonitrile/butadiene/isoprene rubber latex, a chloroprene rubber latex, an acrylate rubber latex, and rubber latices composed mainly of the monomers constituting the aforementioned latices. Suitable resin emulsions are an internally plasticized soft vinyl chloride resin emulsion, a vinyl acetate polymer emulsion, and ethylene/vinyl acetate copolymer emulsion, and resin emulsions composed mainly of the monomers constituting the aforementioned emulsions. These rubber latices and resin emulsions are limited to those which are film-forming at room temperature when cast on a glass sheet, for example. The above rubber latices or resin emulsions may be used either alone or in combination of two or more, and if desired, may further contain other latices or emulsions.

Examples of the fibrous material which is used together with the aforementioned rubber latex or resin emulsion in this invention include (1) vegetable fibrous materials such as cotton, flax and rice straw, (2) animal fibrous materials such as silk, wool and collagen fibers obtained from the skins of beasts, fish and whales, (3) synthetic fibers, for example, regenerated fibers such as viscose fibers, cuprammonium fibers or soybean protein fibers, semi-synthetic fibers such as cellulose acetate fibers, and fibrous materials composed of synthetic polymers such as polyamide fibers, poval fibers (e.g., vinylon fibers), polyvinylidene chloride fibers, polyvinyl chloride fibers, acrylic fibers and polyester fibers, and (4) mineral fibrous materials, for example, artificial mineral fibers such as glass fibers, carbon black fibers or rock wool, and natural mineral fibers such as asbestos. The fibrous material of the types exemplified above generally has a diameter of about 0.01 to 25μ. There is no particular limit to the length of the fibrous material.

But for obtaining adhesive compositions having good dispersibility, the length is preferably 0.1 to 10 mm, and its aspect ratio (i.e., the length-to-diameter ratio) is preferably at least 10. These fibrous materials may be used alone or in admixture of two or more species. The amount of the fibrous material is 1 to 200 parts by weight, preferably 10 to 100 parts by weight, per 100 parts by weight of the solid polymer content of the rubber latex or resin emulsion. If the amount is less than 1 part by weight, the resulting adhesive composition lacks peelability, and if it exceeds 200 parts by weight, the stability and bond strength of the resulting adhesive composition are reduced.

A coagulated mass may sometimes occur during the mixing of the polymeric substance and the fibrous material, or after the lapse of a certain period of time from the end of mixing. In order to maintain stability during or after mixing, it is preferred to add an anionic or nonionic surface-active agent. Useful anionic surfactants include, for example, alkali salts of fatty acids, sulfate ester salts of higher alcohols, alkali salts of alkylbenzenesulfonic acids, alkali salts of alkylnaphthalenesulfonates, a naphthalene sulfonate salt/formaldehyde condensate, and alkyl phosphate salts. Examples of suitable nonionic surfactants are polyoxyethylene alkyl ethers, polyoxyethylene alkyl phenol ethers, and sorbitan alkyl ethers. The amount of the surface-active agent is up to 50 parts by weight, preferably 2 to 20 parts by weight, per 100 parts by weight of the solid polymeric substance content. If the amount exceeds 50 parts by weight, the strength of the adhesive layer is reduced and its drying property is also impaired.

The adhesive composition of this invention should have a viscosity of 50 to 5,000 poises, preferably 100 to 1,000 poises. Adhesives having a viscosity of less than 50 poises cannot have peelability, and may penetrate into those substrates which have a relatively rough surface and are porous, such as concrete and mortar, so that it is impossible to decrease the effective area of adhesion. Adhesives having a viscosity exceeding 5,000 poises have markedly reduced coating characteristics, and cannot be used for practical purposes. The adjustment of the viscosity can be performed by suitably selecting the mixing ratio between the polymeric substance and the fibrous material. But for increasing productivity and economy, it may be accomplished by adding a water-soluble polymeric compounds usually employed as a thickner such as polyacrylic acid salts, carboxymethyl cellulose, casein, alginic acid salts and polyvinyl alcohol, or a filler such as calcium carbonate, aluminum hydroxide, carbon black, white carbon, talc, wood dust, shaving dust, and microspheres (e.g., Microballoon).

Preferably, a suitable amount of an ordinary antioxidant or a heat or light stabilizer, such as phenolic compounds amine compounds, and phosphate ester type compounds, is added to the adhesives of this invention in order to prevent deterioration of the polymeric substance under the action of heat, light and/or oxygen.

The adhesives of this invention have many advantages, among which are:

(1) Since the adhesives contain no volatile solvent, they are free from the defects associated with the inflammability and toxicity of the solvent, and ensure safety to the working personnel and good sanitation of the working environment.

(2) Since the adhesives have a high viscosity, it is especially effective for application to porous materials, materials having many raised and depressed parts, and to those parts which after the application of the adhesive may cause the adhesive to sag (for example, ceilings).

(3) Since the adhesives have superior peelability, the replacement of bonded materials can be easily undertaken.

(4) Since the adhesives have good drying property, the open time at the time of coating (the time from the coating of the adhesive on the substrate to the time at which the adherend is applied) is not particularly required. In addition, in several hours after the application of the adherend to the substrate, the bonded material can endure use (for example, persons can walk on it).

Accordingly, the adhesives of this invention are widely acceptable for bonding an adherend such as papers, synthetic fibrous cloths, inorganic fibrous cloths and foamed rubber sheets to a substrate composed of a material such as concrete, mortar, asphalt, asbestos, synthetic resins, wood and iron.

The invention will be illustrated specifically by the following Examples. All parts and percentages in these examples are by weight unless otherwise specified.

EXAMPLE 1

Ten parts (as solids content; the same basis will apply in the following Examples) of an acrylonitrile/butadiene rubber latex (NIPCL LX 531, a trademark for a product of Japanese Geon Co., Ltd.; rubber content 64%), 50 parts of a styrene/butadiene rubber latex (NIPCL LX 4850, a trademark for a product of Japanese Geon Co., Ltd.; rubber content 63%), and 10 parts of a carboxy-modified styrene/butadiene rubber latex (NIPOL LX 424, a trademark for a product of Japanese Geon Co., Ltd.; rubber content 50%) were mixed, and 3 parts of a nonionic surfactant (polyoxyethylene alkyl ether) was added. The mixture was stirred, and then 20 parts of asbestos fibers (length 0.1 to 1 mm, diameter 0.03 to 0.2μ; a product of Johns-Manville Co.) and 2 parts of an antioxidant (phenyl 3-naphthylamine) were added, and they were stirred until the entire system became uniformly dispersed. A mixture being a considerably high viscosity was obtained. Ten parts of calcium carbonate was added to the mixture, and they were further stirred to afford a pale gray creamy uniform dispersion which had a viscosity of 600 poises and a pH of 9.5 and remained stable even when stored for a long period of time at 5° to 50° C.

Using the resulting mixture as an adhesives, a test was performed to bond a 1 mm-thick liner board to the surface of concrete. The results are shown in Table 1.

TABLE 1

| Run. No. | Test conditions (*3) | Peeling characteristics (*4) | | Creep characteristics (*5) | |
|---|---|---|---|---|---|
| | | Appearance of failure by peeling test | Strength (Kg/inch width) | Appearance of failure by shear stress | Strength (Kg/cm$^2$) |
| 1 | A | The liner board peeled | 0.8 | They were bonded so | Unmeasurable |

TABLE 1-continued

| Run. No. | Test conditions (*3) | Peeling characteristics (*4) | | Creep characteristics (*5) | |
|---|---|---|---|---|---|
| | | Appearance of failure by peeling test | Strength (Kg/inch width) | Appearance of failure by shear stress | Strength (Kg/cm$^2$) |
| (invention) | B<br>C | from the concrete surface without breakage of the material. | 0.7<br>0.8 | firmly as to cause the breakage of the liner board. | because the breakage of the liner board occured |
| 2 (control) (1*) | A<br>B<br>C | The liner board was broken, and partly remained adhered to the concrete surface | Unmeasurable because of the breakage of the liner board | They were bonded so firmly as to cause the breakage of the liner board. | Unmeasurable because the breakage of the liner board occured |
| 3 (control) (2*) | A<br>B<br>C | The liner board was broken, and partly remained adhered to the concrete surface | Unmeasurable because of the breakage of the liner board | They were bonded so firmly as to cause the breakage of the liner board. | Unmeasurable because the breakage of the liner board occured |

(*1): A vinyl acetate polymer emulsion (solid content 40%, a product of Dainippon Ink and Chemicals Co., Ltd,.) was used alone as an adhesive.
(*2): A 20% toluene solution of natural rubber was used alone as an adhesive.
(*3): "A" means that the bonded assembly was allowed to stand for 3 months at room temperature after bonding; "B" means that the bonded assembly was allowed to stand at room temperature for 1 day after bonding, and then irradiated for 100 hours in a Fade-Ometer; and "C" means that the bonded assembly was allowed to stand at room temperature for 1 day after bonding, and then heat-treated for 10 days in a gear oven at 70° C.
(*4): The characteristics attained when the liner board was peeeled from the concrete surface at an angle of 180° (U peel).
(*5): The characteristics attained when the liner board was pulled by a load in a direction parallel to the concrete surface (along the concrete surface).

As is clear from Table 1, the adhesives of this invention and the control adhesives both exhibited sufficiently firm adhesion strength to shear stress (creep), but with regard to peeling stress, an evident difference was seen between the adhesive of this invention and the control adhesives. When the adhesive of this invention was used, the adherend (liner board) peeled from the substrate (the concrete surface) without breakage of the material, and no adhesive remained on the substrate. In contrast, when ordinary adhesives were used, the adherend was broken, and remained attached to the substrate. Accordingly, when a new adherend is to be adhered onto the substrate, much labor is required to remove the residue on the substrate surface.

EXAMPLE 2

The same test as in Run No. 1 of Example 1 was performed except that various carpets, foam-backed carpets, wall papers, cloths, and cushioned floors instead of the liner board used as adhered in Run No. 1 of Example 1. The resulting bonded assemblies showed a strength, in a peeling characteristic test, of 0.4 to 2.0 Kg/inch width, and the conditions of the assemblies at the time of peeling, and their creep characteristics were the same as the results obtained in Run No. 1 of Example 1. These results demonstrate that when the adhesive of this invention is used, there is no difference in peelability according to the type of the adherend because the peeling occurs between the adhesive layer and the substrate surface.

EXAMPLE 3

The same experiment as in Run No. 1 of Example 1 in accordance with test conditions C was performed except that pulp, shaving dust of cattle skin, or acrylic fibers were used instead of the asbestos fibers as the fibrous material. The results are shown in Table 2. In all runs, the adherends showed superior peelability.

TABLE 2

| Run No. | Fibrous material | Viscosity of the adhesive (PS) | Peeling characteristics | | Creep characteristics | |
|---|---|---|---|---|---|---|
| | | | Appearance of failure by peeling test | Strength (Kg/inch width) | Appearance of failure by shear stress | Strength (Kg/cm$^2$) |
| 1 | Pulp (*1) | 800 | The liner board peeled from the concrete surface without breakage. | 0.8 | The liner was broken. | Unmeasurable because of the breakage of the liner board |
| 2 | Shaving dust of cattle skin (*2) | 900 | The liner board peeled from the concrete surface without breakage. | 0.8 | The liner was broken. | Unmeasurable because of the breakage of the liner board |
| 3 | Acrylic synthetic fibers (*3) | 700 | The liner board peeled from the concrete surface without breakage. | 0.7 | The liner was broken. | Unmeasurable because of the breakage of the liner board |

(*1): a product of Sanyo Kokusaku Pulp K.K. (length 1.5 to 4 mm; diameter 20μ)
(*2): a product of Nippon Hikaku K.K. (length 1.0 to 4 mm; diameter 20μ)
(*3): a product of Asahi Kasei Kogyo K.K. (length 2 to 5 mm; diameter of 7 to 8μ)

EXAMPLE 4

The same experiment as in Example 1, Run No. 1 under the test conditions C was performed except that each of the various latices shown in Table 3 was used instead of the rubber latex mixture in Run No. 1, Example 1. The results are shown in Table 3.

TABLE 3

| Run No. | Latex | Viscosity of the adhesive (PS) | Peeling characteristics | | Creep characteristics | |
|---|---|---|---|---|---|---|
| | | | Appearance of failure by peeling test | Strength (Kg/inch width) | Appearance of failure by shear stress | Strength (Kg/cm²) |
| 1 | Styrene/butadiene rubber latex (*1) | 500 | The liner peeled from the concrete surface without breakage. | 0.6 | The liner was broken. | Unmeasurable because of the breakage of the liner board |
| 2 | Natural rubber latex | 900 | The liner peeled from the concrete surface without breakage. | 0.9 | The liner was broken. | Unmeasurable because of the breakage of the liner board |
| 3 | 80 parts of styrene/butadiene rubber latex (*1) and 20 parts of vinyl acetate polymer emulsion (*2) | 800 | The liner peeled from the concrete surface without breakage. | 0.9 | The liner was broken. | Unmeasurable because of the breakage of the liner board |
| 4 | Acrylate rubber latex (*3) | 800 | The liner peeled from the concrete surface without breakage. | 0.8 | The liner was broken. | Unmeasurable because of the breakage of the liner board |

(*1): NIPOL LX 4850, a product of Japanese Geon Co., Ltd.; solid rubber content 63%.
(*2): a product of Dainippon Ink and Chemicals Co., Ltd.; solid polymer content 40%; the same material as shown in Table 1.
(*3): NIPOL LX 812, a product of Japanese Geon Co., Ltd.; solid rubber content 47%.

EXAMPLE 5

In Run No. 1 of Example 3, the amount of the pulp was changed to 80 parts and 190 parts, and water was added in an amount of 30 parts and 100 parts respectively. Using the resulting adhesives, the same adhesion test was performed. These adhesives all had a viscosity of 800 poises, and a strength, in a peeling characteristic test, of 0.8 kg/inch width and 0.4 kg/inch width. The conditions at the time of peeling and the creep characteristics were the same as in Example 3.

EXAMPLE 6 (CONTROL)

In Run No. 1 of Example 1, poly(sodium acrylate) (a product of Toa Gosei Kagaku Kogyo K.K.) was used as a thickner instead of the asbestos fibers, and the same test was performed under the test conditions C. The results are shown in Table 4.

TABLE 4

| Run No. | Amount of the poly(sodium acrylate) (parts) | Viscosity of the adhesive (PS) | Peeling characteristics | | Creep characteristics | |
|---|---|---|---|---|---|---|
| | | | Appearance of failure by peeling test | Strength (Kg/inch width) | Appearance of failure by shear stress | Strength (Kg/cm²) |
| 1 | 0.0 | 3 | The liner board was broken. | Unmeasurable | The liner board was broken. | Unmeasurable |
| 2 | 2.0 | 300 | The liner board was broken. | Unmeasurable | The liner board was broken. | Unmeasurable |

What we claim is:

1. A method of removably bonding an adherend selected from paper, cushioned floor and foam-backed carpet to a substrate composed of concrete, synthetic resin board or wood, which allows the adherend to be removed from the substrate without breakage of the substrate and without adhesive remaining on the substrate, with a peel-up type adhesive which permits the adherend and adhesive to be peeled from the substrate without breakage of the adherend and without any adhesive remaining on the substrate which comprises bonding said adherend to the substrate with a peel-up type adhesive composition having a viscosity of 500 to 5,000 poises and consisting essentially of a rubber latex containing a polymeric substance which is film-forming at room temperature selected from the group consisting of a natural rubber latex, a styrene/butadiene rubber latex, a carboxy-modified styrene/butadiene rubber latex, an acrylonitrile/butadiene rubber latex, a styrene/isoprene rubber latex, a methyl methacrylate/butadiene rubber latex, a styrene/butadiene/methyl methacrylate rubber latex, an acrylonitrile/butadiene/isoprene rubber latex, and a chloroprene rubber latex, and 20 to 200 parts by weight, per 100 parts by weight of the solid polymeric substance content of the rubber latex, of a fibrous material and 2 to 20 parts by weight, per 100 parts by weight of the solid polymeric substance content of the rubber latex, of a nonionic surface-active agent; and removing said adherend from said substrate by peeling said adherend and adhesive intact from said substrate when it is desired to replace said adherend.

2. The method of claim 1 wherein the peel-up type adhesive composition has a viscosity of from 500 to 1,000 poises.

3. The method of claim 1 wherein the fibrous material is selected from the group consisting of vegetable fibrous materials, animal fibrous materials, synthetic fibers, and mineral fibrous materials, and has a diameter of 0.01 to 25$\mu$ and a length of 0.1 to 10 mm, and an aspect ratio of at least 10.

* * * * *